(12) United States Patent
Brady et al.

(10) Patent No.: US 6,320,509 B1
(45) Date of Patent: Nov. 20, 2001

(54) RADIO FREQUENCY IDENTIFICATION TRANSPONDER HAVING A HIGH GAIN ANTENNA CONFIGURATION

(75) Inventors: Michael John Brady, Brewster; Dah-Weih Duan; Venkata S. R. Kodukula, both of Yorktown Heights; Rene D. Martinez, Putnam Valley; Paul Andrew Moskowitz, Yorktown Heights, all of NY (US); Philip Murphy, New Fairfield, CT (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/374,956

(22) Filed: Aug. 16, 1999

Related U.S. Application Data

(63) Continuation-in-part of application No. 09/277,623, filed on Mar. 26, 1999, and a continuation-in-part of application No. 09/268,896, filed on Mar. 16, 1999, and a continuation-in-part of application No. 09/259,745, filed on Feb. 27, 1999.
(60) Provisional application No. 60/076,364, filed on Feb. 27, 1999, and provisional application No. 60/078,220, filed on Mar. 16, 1998.

(51) Int. Cl.$^7$ .................................................. G08B 13/14
(52) U.S. Cl. .................................. 340/572.7; 340/572.8; 343/6.8 R
(58) Field of Search ............................. 340/686.1, 686.6, 340/572.1, 572.7, 10.1, 18.6, 572.5, 572.8; 343/711, 713, 754, 755, 761, 781 R, 781 P, 782, 786, 6.8 R

(56) References Cited

U.S. PATENT DOCUMENTS

| | | |
|---|---|---|
| 4,075,632 * | 2/1978 | Baldwin et al. ................. 343/6.8 R |
| 4,633,264 | 12/1986 | Imazeki et al. ...................... 343/786 |
| 4,903,038 | 2/1990 | Massey ............................... 343/786 |
| 5,392,049 * | 2/1995 | Gunnarsson ...................... 340/686.6 |
| 5,442,366 | 8/1995 | Sanford ......................... 343/700 MS |
| 5,448,110 | 9/1995 | Tuttle et al. ........................ 340/10.1 |
| 5,486,836 | 1/1996 | Kuffner et al. ............... 343/700 MS |
| 5,528,222 | 6/1996 | Moskowitz et al. ............. 340/572.7 |
| 5,608,263 * | 3/1997 | Drayton et al. ...................... 257/728 |
| 5,680,144 | 10/1997 | Sanad ............................ 343/700 MS |
| 5,682,143 | 10/1997 | Brady et al. ..................... 340/572.7 |
| 5,714,937 * | 2/1998 | Campana, Jr. .................... 340/573.1 |
| 5,874,919 | 2/1999 | Rawnick et al. ............. 343/700 MS |
| 5,883,604 | 3/1999 | Nicely ................................. 343/786 |
| 5,907,305 | 5/1999 | Epp et al. ..................... 343/700 MS |

FOREIGN PATENT DOCUMENTS

407312567A * 11/1995 (JP) .............................. H04B/01/38

* cited by examiner

*Primary Examiner*—Van T. Trieu
(74) *Attorney, Agent, or Firm*—O'Melveny & Myers LLP

(57) ABSTRACT

A radio frequency identification transponder has a high gain antenna for increased range. In an embodiment, the radio frequency transponder has a reflector to increase its operative range. A system of one or more reflectors is operatively associated with a transponder and may be formed out of any sort of radio frequency reflective material. The reflector system can enhance reception or transmission of radio waves by or from the transponder. The reflector system may also be used to provide for selective coupling of the radio frequency transponder with a base station, user- or vehicle-supported reader, or the like based on relative orientation. In addition, the reflector system may be used to selectively reflect particular radio waves. In another embodiment, the radio frequency transponder has a horn antenna providing increased gain and directivity. In yet another embodiment, the radio frequency transponder has a patch antenna providing increased gain and circular polarization. The patch antenna may further comprise a patch antenna array, a multi-layer patch or a dipole comprised of patch elements.

32 Claims, 9 Drawing Sheets

RADIO FREQUENCY IDENTIFICATION TRANSPONDER HAVING A HIGH GAIN ANTENNA CONFIGURATION

CROSS-REFERENCE TO RELATED APPLICATIONS

The present application is a continuation-in-part of each of the following U.S. patent applications: (a) Ser. No. 09/259,745, filed Feb. 27, 1999, entitled "Radio Frequency Identification Transponder Having a Reflector," which claims priority under 35 U.S.C. §119(e) to U.S. provisional application Ser. No. 60/076,364, filed Feb. 27, 1998; (b) Ser. No. 09/268,896, filed Mar. 16, 1999, entitled "Radio Frequency Identification Transponder Having A High Gain Antenna," which claims priority under 35 U.S.C. §119(e) to U.S. Provisional Application No. 60/078,220, filed Mar. 16, 1998; and (c) Ser. No. 09/277,623, filed Mar. 26, 1999, entitled "Radio Frequency Identification Transponder Having A High Gain Antenna Configuration," which also claims priority under 35 U.S.C. §119(e) to U.S. Provisional Application Ser. No. 60/078,220, filed Mar. 16, 1998. The foregoing applications are incorporated by reference herein in their entirety.

BACKGROUND OF THE INVENTION

1. Field of the Invention

The present invention relates generally to radio frequency (RF) transponders such as radio frequency identification (RFID) transponders, and more specifically, to an RFID transponder having a high gain antenna configuration.

2. Description of Related Art

In the automatic data identification and collection industry, the use of RFID transponders (also known as RFID tags) has grown in prominence as a way to track data regarding an object to which an RFID transponder is affixed. An RFID transponder generally includes a semiconductor memory in which information may be stored. An RFID interrogator containing a transmitter-receiver unit is used to query an RFID transponder that may be at a distance from the interrogator. The RFID transponder detects the interrogating signal and transmits a response signal containing encoded data back to the interrogator. RFID systems are used in applications such as inventory management, security access, personnel identification, factory automation, automotive toll debiting, and vehicle identification, to name just a few.

RFID systems provide certain advantages over conventional optical indicia recognition systems (e.g., bar code symbols). For example, the RFID transponders may have a memory capacity of several kilobytes or more, which is substantially greater than the maximum amount of data that may be contained in a bar code symbol. The RFID transponder memory may be re-written with new or additional data, which would not be possible with a printed bar code symbol. Moreover, RFID transponders may be readable at a distance without requiring a direct line-of-sight view by the interrogator, unlike bar code symbols that must be within a direct line-of-sight and which may be entirely unreadable if the symbol is obscured or damaged. An additional advantage of RFID systems is that several RFID transponders may be read by the interrogator at one time.

One important consideration in an RFID system is the range at which the radio frequency transponder may be read. A known method to increase the range of a radio frequency transponder is to increase the power of the interrogating signal, which necessitates a greater use of energy. A drawback of this method is that increasing the energy of the interrogating signal may involve adding additional and more costly components to an RF transmitter-receiver unit of the interrogator. This may prove costly not only to manufacture, but also to utilize in its intended environment. Another consideration in an RFID system is that, in some instances, it is desirable to selectively orient the field-of-view of an RFID transponder relative to an interrogating source, receiver, or the like. For example, the radio frequency transponder might be oriented so that it would respond to only one of two interrogating sources.

Consequently, it would be advantageous to provide an RF transponder with an increased effective range and/or a selective field-of-view in a cost effective and efficient manner.

SUMMARY OF THE INVENTION

It is the intention of the present invention to provide an improved radio frequency transponder system with a reflector that increases the effective range of the radio frequency transponder so that the radio frequency transponder may be utilized over an increased distance.

A radio frequency identification transponder assembly in accordance with a first embodiment of the invention includes a radio frequency transponder disposed next to a reflector. The reflector may comprise any sort of radio frequency reflective material. The reflector may be formed with the radio frequency transponder at its focus region so as to enhance the reception of transmitted energy (for power or information transfer), and/or the transmission of signal energy by the radio frequency transponder. In this manner, the reflector provides increased range of useful energy transfer between the radio frequency transponder and a base station or the like. For example, the reflector may increase the effective range by focusing an increased reception area of the reflector to a radio frequency transponder so as to increase the distance at which the radio frequency transponder may receive an interrogating signal or other energy, and/or transmit data.

In accordance with a second embodiment of the invention, a radio frequency transponder is disposed next to a reflector that may selectively orient the radio frequency transponder with respect to a base station or the like. For example, a reflector may be formed or positioned relative to the radio frequency transponder so as to supply an interrogating signal from one source while excluding a signal from a second source. Alternatively, the reflector may selectively reflect a radio wave so as to reflect a wave from one specific source to the transponder yet exclude transmissions from other sources.

In accordance with a third embodiment of the invention, the radio frequency transponder includes an radio frequency identification integrated circuit coupled to a horn antenna. The integrated circuit may be directly coupled to the interior walls of a waveguide portion of the horn antenna. Alternatively, the integrated circuit may be electrically coupled to the waveguide portion by an inductive coupler. The horn antenna provides increased gain and directivity for the radio frequency transponder.

In accordance with a fourth embodiment of the invention, the radio frequency transponder includes a multi-layer patch antenna. The patch antenna includes a feeder patch coupled to a radio frequency identification integrated circuit, and a radiating patch spaced from the feeder patch. The patch antenna may further include a hybrid coupler electrically connecting the radio frequency identification integrated circuit with the feeder patch, so that the feeder patch is driven by two signals having a 90° phase difference and a 90° difference in orientation. The patch antenna provides increased gain and circular polarization for the radio frequency transponder.

In accordance with a fifth embodiment of the invention, the radio frequency transponder includes a patch antenna array. The patch antenna array includes a plurality of patch antennas coupled to a radio frequency identification integrated circuit through at least one impedance transformer. The patch antenna array may be adapted to provide linear polarization or circular polarization.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF PREFERRED EMBODIMENTS

The present invention satisfies the need for an RF transponder having an increased effective range and/or a selective field-of-view. In the detailed description that follows, like element numerals are used to describe like elements illustrated in one or more of the figures.

Figure 1A:
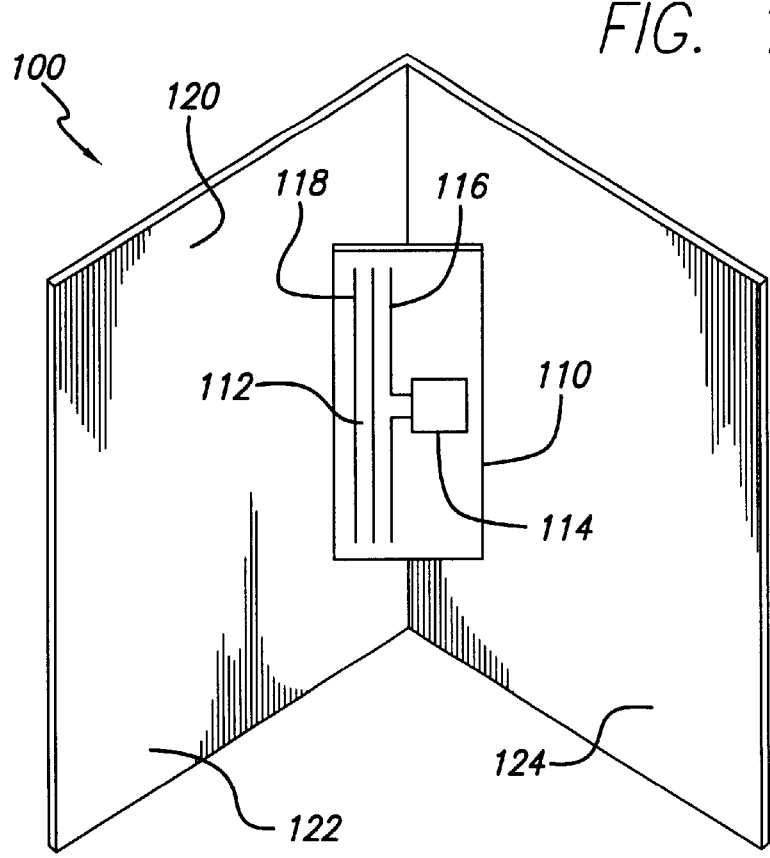
FIG. 1A is an isometric view of a radio frequency identification transponder assembly having a v-shaped or corner reflector.

Referring now to FIG. 1A, an exemplary embodiment of a radio frequency identification transponder assembly 100 is shown. A radio frequency transponder identification assembly 100 comprises a radio frequency transponder 110 that further includes an antenna 116 and a radio frequency integrated circuit 114 (RFIC). The RFIC 114 may include a radio frequency processing section (typically referred to as a front end) and a signal processing section. The front end may be any known front end design used with an antenna 116. The signal processing section may include logic circuits and memory for processing and storing information. The antenna 116 enables the RFIC 114 to detect an interrogating field, and/or, where appropriate, a programming field. An antenna circuit 112 may include impedance matching circuits 118 (i.e. microstrip lines, or the like). These impedance matching circuits 118 interconnect the RFIC 114 to the antenna 116 of the antenna circuit 112 to carry an RF signal and energy from the RFIC 114 to the antenna 116 and/or from the antenna 116 to the RFIC 114. The antenna 116 also serves to transmit a response to an interrogating field from an interrogator 240 (described below with respect to FIGS. 15A–15B).

In an exemplary embodiment, the antenna 116 is provided from a thin pattern (typically 18 to 35 micron thick) of a conductive metal, such as copper. This pattern may be formed by plating or adhering or screening a thin layer of conductive metal onto a substrate, which is etched to form the specific geometric configuration of the antenna. Similarly, one or more impedance matching elements may be integrally formed on the substrate to modify the impedance of the antenna circuit. The impedance matching elements may be, for example, lumped circuit elements, distributed microwave circuit elements, or parasitic elements that are electromagnetically coupled to the antenna (i.e., not electrically connected). Depending on the properties desired, the antenna circuit 112 of the present invention may employ any of a large number of different antennas elements having various configurations and geometries (i.e. monopole, dipole, folded dipole. loop, slot, coil, spiral, meander, patch, etc.). For example, the antenna 116 may be a simple dipole antenna, or the dipole antenna may be bent into a "meander" pattern to reduce the antenna's overall length. Alternatively, instead of a dipole, the antenna 116 may be a patch antenna, or may be formed in the shape of a spiral.

As shown in FIG. 1A, the radio frequency identification transponder assembly 100 includes a reflector 120 disposed proximally to the radio frequency transponder 110. The reflector 120 has a v-shape and is comprised of radio frequency reflective materials suitable for collecting and focusing radio frequency energy to and from an antenna circuit 112. For example, the reflector material may comprise metal (e.g., aluminum, steel, or metal allows), plastics (e.g., polyvinyl chloride, ABS plastic), metal-coated plastics (e.g., aluminum or gold flash coated on plastic), or wire mesh (e.g., metal screen material). As a result, the gain of the antenna circuit 112 is increased and the operating range of the radio frequency transponder 110 is also increased. In this embodiment, the reflector 120 includes a first reflecting surface 122 and a second reflecting surface 124 for reflecting radio frequency waves. The first and second reflecting surfaces 122, 124 are disposed at an approximately 90° angle to each other.

The size of the reflector 120 relates to the read distance of the radio frequency identification transponder assembly 100. Particularly, the read distance (R) of a radio frequency transponder assembly is proportional to the square root of the directivity (D), as follows:

$$R \sqrt{D}$$

Further, the directivity of the radio frequency transponder assembly may be estimated from the following approximation formula:

$$D = 4\pi A/\lambda^2$$

where A is the effective cross-sectional area of the aperture of the reflector, and λ is the wavelength of the system. Thus, the read distance (R) of the radio frequency transponder is proportional to the square root of the effective cross-sectional area (A) of the reflector, as follows:

$$R \sqrt{A}$$

In other words, one way to increase the read distance of a radio frequency transponder assembly is to increase the reflector area. The greater the distance, however, the greater the necessity of the correct alignment of the source of the radio waves with the reflector. For example, if a larger reflector is utilized to increase the read distance of a radio frequency transponder, the more accurately the interrogator must be placed in front of the reflector.

Figure 1B:
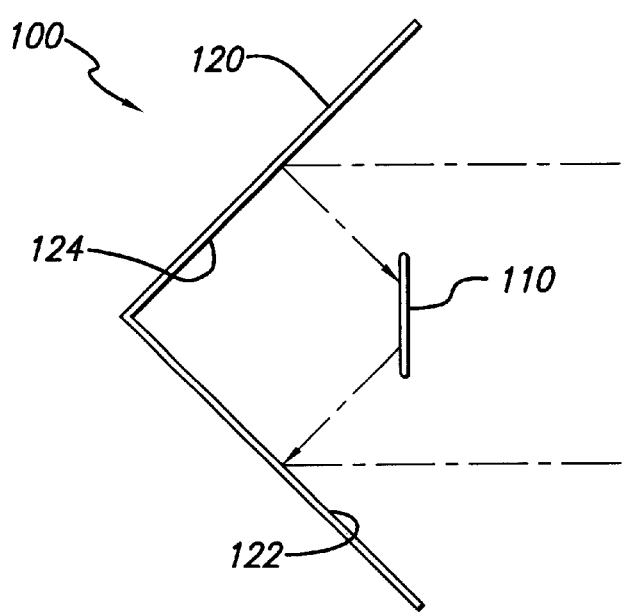
FIG. 1B is a top plan view of the radio frequency transponder assembly shown in FIG. 1A.

FIG. 1B illustrates the radio frequency transponder 110 disposed near a reflector 120 so that the reflector 120 may reflect radio waves, represented by arrows in the illustration. The radio waves are concentrated and focused in a particular direction so that the radio frequency transponder 110 may have an increased operable range. In this way, the energy received by the radio frequency transponder 110 is increased. Additionally, the reflector 120 may operate to increase the transmitting range of the radio frequency transponder 110. By receiving focused energy from the reflector 120, the radio frequency transponder 110 may modulate a more powerful radio wave. The reflector 120 may also operate so as to focus energy radiated from the radio frequency transponder 110 more directly toward a base station (such as interrogator 240 of FIG. 13A), in order to increase the transmitting range of the transponder 110.

Figure 2:
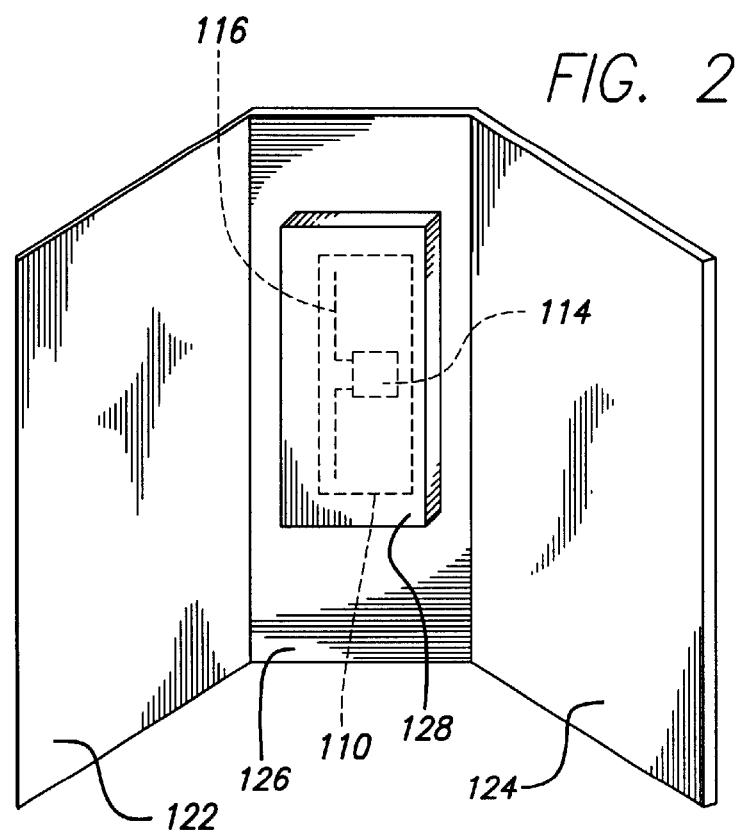
FIG. 2 is an isometric view of a radio frequency identification transponder assembly having a v-shaped or corner reflector as shown in FIG. 1A, further including a dipole-over-ground plane antenna structure.

Referring now to FIG. 2, an exemplary embodiment of a radio frequency identification transponder assembly 100 is shown wherein a radio frequency transponder 110 has a dipole-over-ground plane (DOG) antenna structure 116. The DOG structure allows the radio frequency transponder to be placed on metal or RF absorbing surfaces and to be read over an increased range. As described above, the radio frequency transponder 110 preferably includes an RF integrated circuit 114 (RFIC) and a dipole antenna 116 configured to communicate with an RF system. The RFIC 114 preferably includes RF modulator circuits, logic circuits, and memory mounted to a substrate and bonded to the dipole 116 antenna. The radio frequency transponder 110 is provided within a support housing 128 that encloses the radio frequency transponder and protects it from environmental contaminants. The support housing 128 includes a base plate 126 comprised of metal which provides an electrically conducting ground plane for the radio frequency transponder 110. The dipole antenna 116 is spaced a predetermined distance from the base plate 126 by the support housing 128. An example of an RFID transponder having a DOG antenna structure is provided by co-pending patent application Ser. No. 09/188,089, filed Nov. 6, 1998, for "RFID Tag Having Dipole Over Ground Plane Antenna," incorporated by reference herein.

The base plate 126 provides a central portion of a three-sided reflector so as to further increase the effective range of the radio frequency transponder 110 in the same manner as described above with respect to FIGS. 1A–1B. The reflector includes a first reflector surface 122 and a second reflector surface 124 that are coupled to opposite edges of the base plate 126 to form an approximately 90° angle between the first and second reflector surfaces 122, 124. The reflector surfaces 122, 124 reflect RF waves to and from the radio frequency transponder 110.

Figure 3:
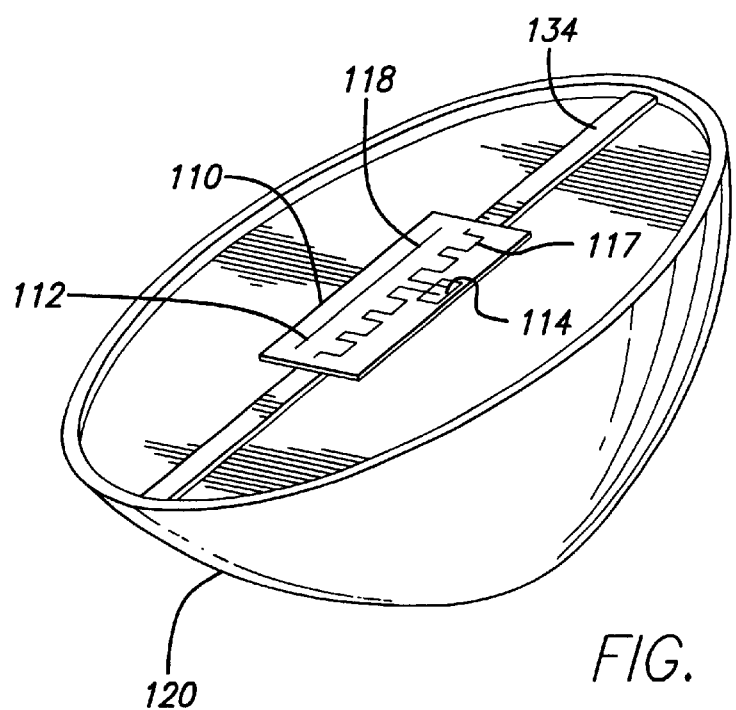
FIG. 3 is an isometric view of a radio frequency identification transponder assembly having a dish reflector.

Referring now to FIG. 3, an exemplary embodiment of the present invention is shown wherein a reflector 130 is formed as a dish. In this example, a radio frequency transponder 110 is disposed on a support beam 134 that extends across a rim of the dish reflector 130. It should be realized that the dish reflector 130 may have a parabolic, paraboloidal, elliptical, ellipsoidal, hyperbolic, hyperboloidal, spherical, spheroid, or any other shape contemplated by persons of ordinary skill in the art. In this embodiment, the radio frequency transponder 110 may include a radio frequency integrated circuit 114 connected via an antenna circuit 112, which may include an impedance matching circuit 118, to a meander dipole antenna 117. As described above, a meander dipole antenna 117 is bent into a "meander" pattern in order to reduce the antenna's overall length. It should be appreciated that other types of antenna patterns can also be advantageously utilized.

As with the corner reflectors 120 shown in FIGS. 1A, 1B and 2, the dish reflector 130 serves to reflect radio waves communicated to and from the radio frequency transponder 110. If the dish reflector 130 has an ellipsoid shape, a radio wave emitted from a focus of the ellipsoid reflector will be reflected convergently off of the concave surface of the reflector toward the other focus of the ellipsoid reflector. As a result, a radio frequency transponder cannot be placed at the center of the ellipsoid reflector. If only a portion of the ellipsoid (or other shape) is used as the reflector, however, the center of the partial ellipsoid and the center of the ellipsoid may be different.

Figure 4:
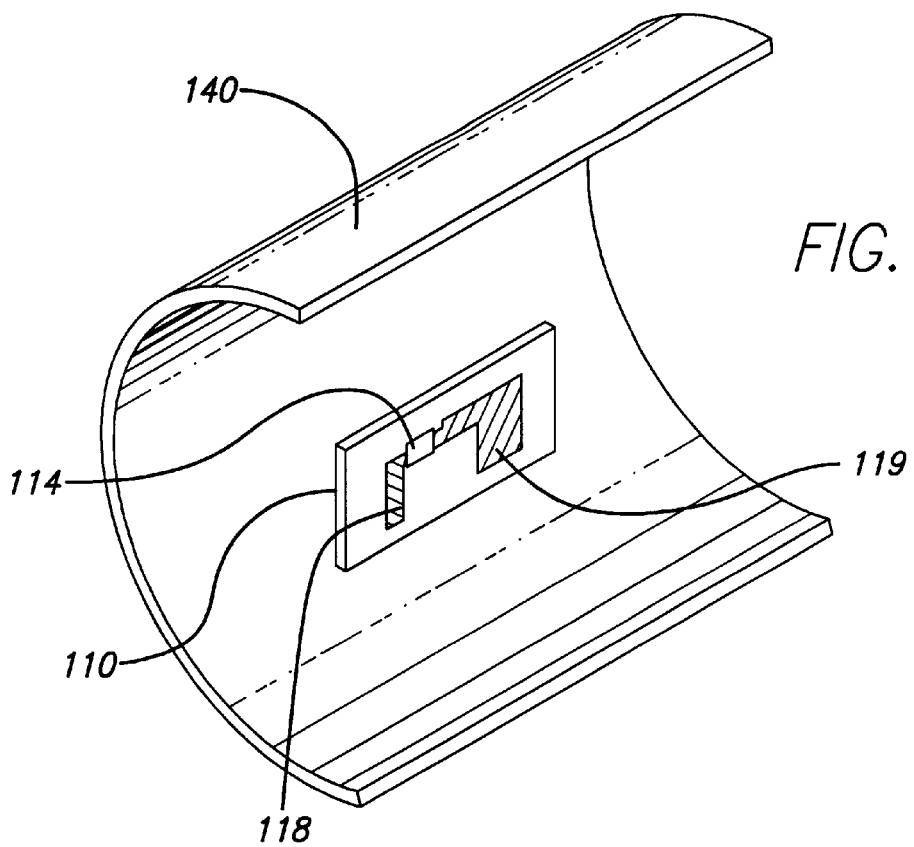
FIG. 4 is an isometric view of a radio frequency identification transponder assembly having cylindrical reflector.

Referring now to FIG. 4 an exemplary embodiment of the present invention is shown wherein a radio frequency transponder 110 is disposed adjacent to a reflector 140 formed in a generally cylindrical shape, e.g., parabolic, elliptical, hyperbolic, circular, and/or curvilinear in cross-section. The radio frequency transponder 110 is mounted to, or substantially suspended from, a generally central portion of the reflector 104. In this example, the radio frequency transponder 110 includes a radio frequency integrated circuit 114 connected to a patch antenna 119, and which may further include an impedance matching circuit 118. It should be appreciated that other types of antenna patterns can also be advantageously utilized. As with the corner reflectors 120 and dish reflector 130 described above, the cylindrical reflector 140 serves to reflect radio waves communicated to and from the radio frequency transponder 110.

Figure 5A:
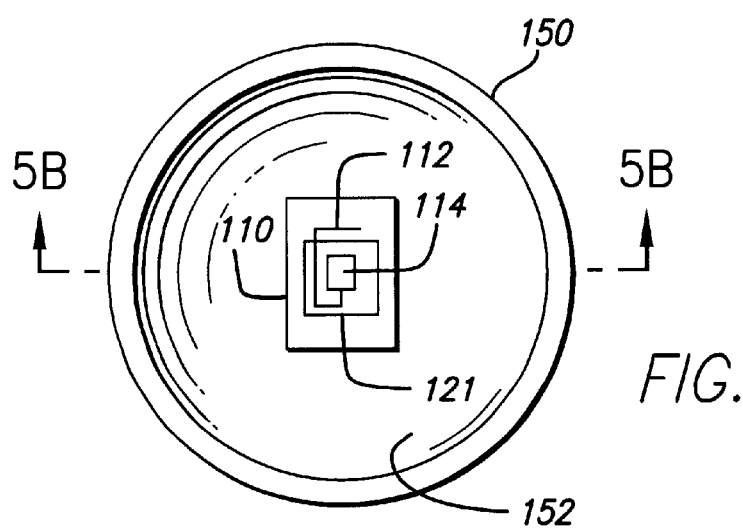
FIG. 5A is an isometric view of a radio frequency identification transponder assembly having a shaped reflector.
Figure 5B:
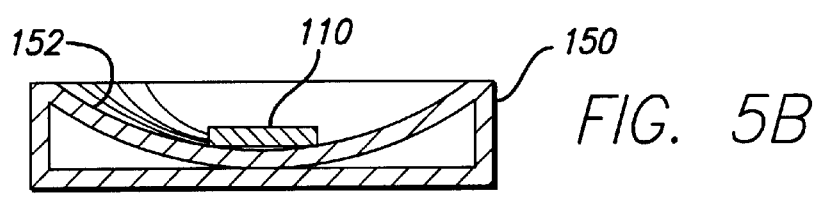
FIG. 5B is a side sectional view of the radio frequency identification transponder assembly and shaped reflector, as taken through the section 5B—5B of FIG. 5A.
Figure 6:
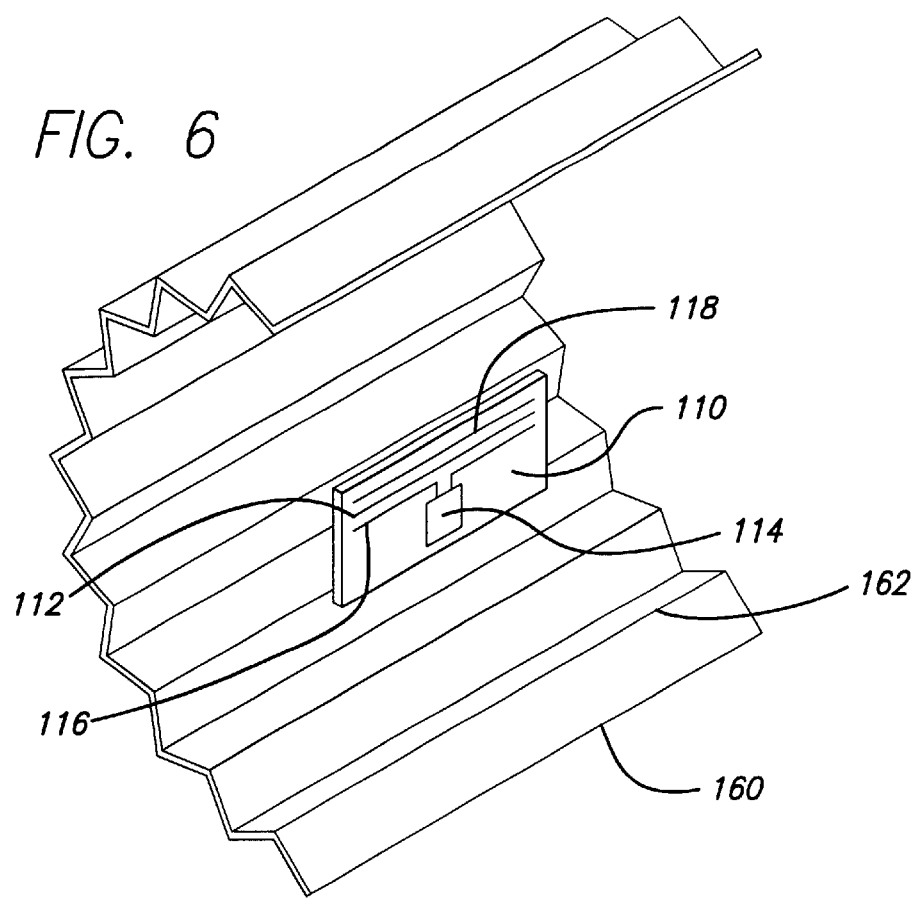
FIG. 6 is an isometric view of a radio frequency identification transponder assembly having a corrugated reflector.

Referring now to FIGS. 5A, 5B and 6, a radio frequency identification transponder 110 including a reflector having a variety of alternative shapes is shown. In FIGS. 5A and 5B, a shaped reflector 150 is shown with the radio frequency identification transponder 110 mounted or otherwise suspended in a central portion thereof. The reflector 150 has a generally concave, shaped surface 152, and is comprised of electrically conductive materials. The precise shape and concavity of the reflector 150 may be specifically selected for a particular application to focus radio waves to interrogate and transmit from the radio frequency transponder 110 in a desired direction and intensity. The transponder 110 may include an antenna circuit formed in a spiral shape 121 connected to a radio frequency integrated circuit 114, but it should be appreciated that other types of antenna patterns can also be advantageously utilized.

In FIG. 6, a corrugated reflector 160 is shown. In this embodiment, the reflector 160 includes a plurality of parallel ridges 162 so as to focus radio waves to and from a radio frequency transponder 110. The radio frequency transponder 110 is mounted to or otherwise suspended from a generally central portion of the reflector 160. The reflector 160 is comprised of electrically conductive materials. The radio frequency transponder may include an antenna circuit 112 to connect a radio frequency integrated circuit 114 to an antenna 116, in this example formed as a dipole. As in the preceding embodiments, it should be appreciated that other types of antenna patterns can also be advantageously utilized. The antenna circuit 112 may further include an impedance matching circuit 118. It should also be appreciated from the foregoing description that a wide variety of reflector shapes can be advantageously utilized, such as a lattice, mesh, grid, ribbed, net, inflatable, or any other surface or material, and not depart from the invention thereof.

Figure 7:
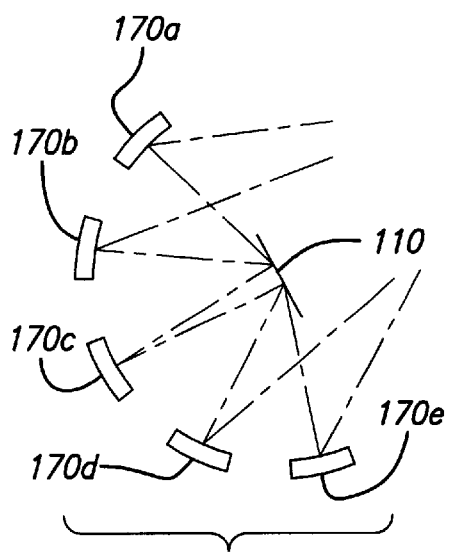
FIG. 7 is an isometric view of a radio frequency identification transponder assembly having a piece-wise linear reflector.
Figure 8:
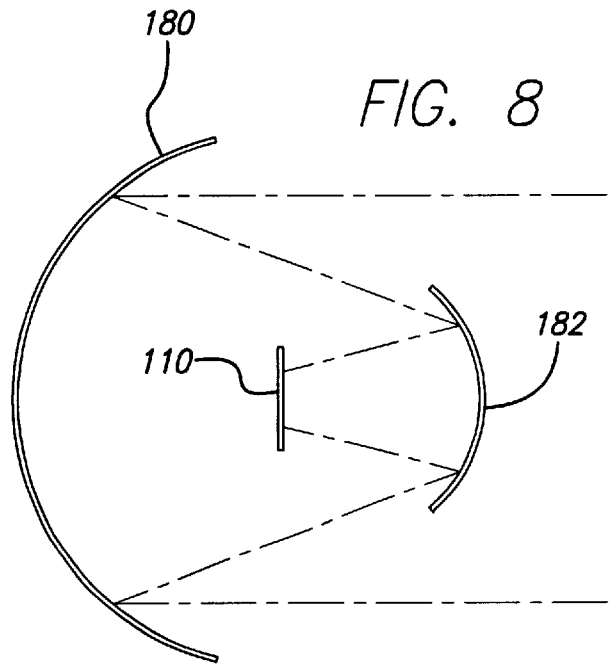
FIG. 8 is an isometric view of a radio frequency identification transponder assembly having multiple reflectors.

Referring now to FIGS. 7 and 8, a plurality of reflectors are used together to further improve the gain and directivity of the radio waves communicated to and from a radio frequency transponder 110. The plurality of reflectors are combined in order to form a focused reflector system. For example, a hyperboloid reflector has both a convex surface and a concave surface. Radio waves incident on the convex surface will be reflected divergently (instead of convergently or focused) as if the radio waves originated from near the focal point of the hyperboloid reflector. With this property, a hyperboloid reflector may be used as a subreflector in a dual-reflector system in which the main reflector is a paraboloid.

In FIG. 7, plural reflectors 170a–170e are disposed in an array proximate to a radio frequency transponder 110. Each one of the individual reflectors 170a–170e may be adapted to reflect radio waves in a desired direction and gain to increase the effective range of the transponder 110. The orientation and position of the reflectors 170a–170e may be selectively controlled to alter the direction and gain as desired.

In FIG. 8, a primary reflector 180 and a secondary reflector 182 are utilized in a compound manner with respect to a radio frequency transponder 110. Each of the primary and secondary reflectors 180, 182 has a generally concave shape, with the primary reflector being generally larger than the secondary reflector. The primary and secondary reflectors 180, 182 are oriented facing each other, with the radio frequency transponder 110 disposed therebetween. Radio waves communicated to the radio frequency transponder 110 are collected by the primary reflector 180 and reflected to the secondary reflector 182. The radio waves then reflect off of the secondary reflector 182 and are directed to the radio frequency transponder 110. By using the reflectors 180, 182 in this compound fashion, the radio waves are focused onto the radio frequency transponder 110, thereby providing more interrogating power. Conversely, radio waves communicated from or reflected by the radio frequency transponder 110 traverse the same path in reverse, thereby increasing the range at which the radio frequency transponder may be detected by an interrogator.

Figure 9:
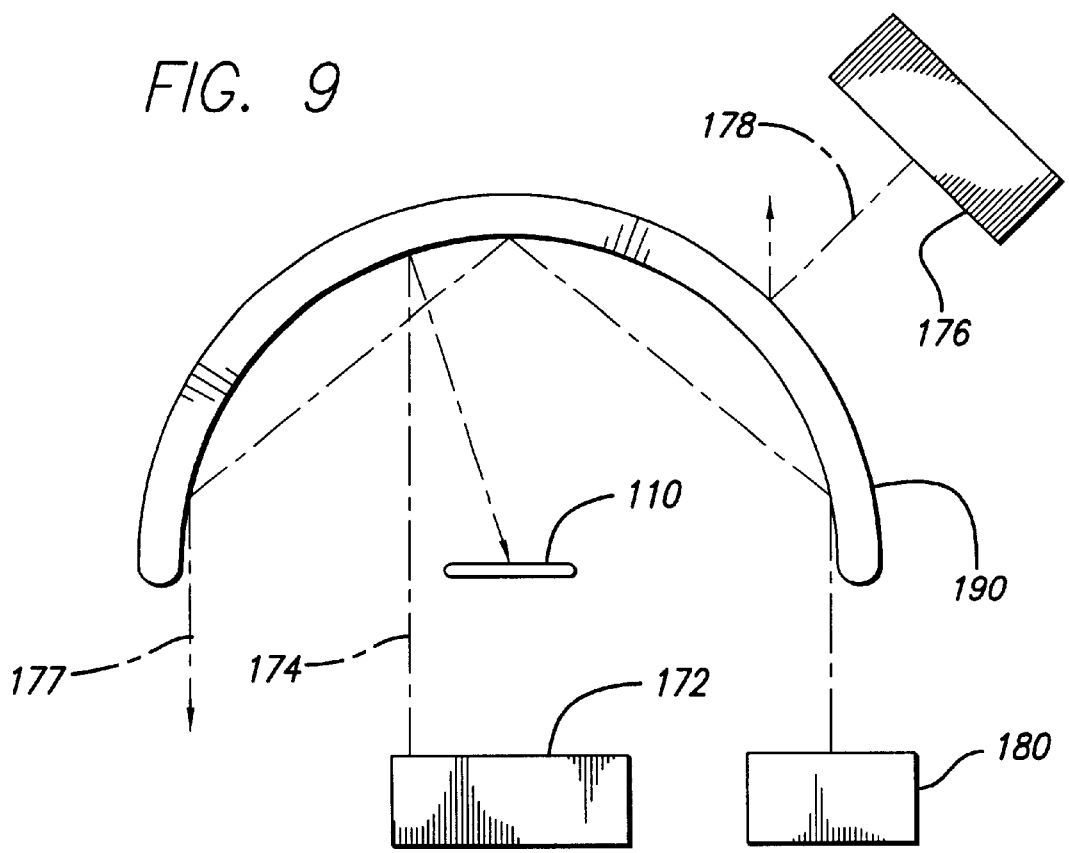
FIG. 9 is a view of a radio frequency identification transponder assembly including a dish reflector oriented so as to reflect signals from a first base station and exclude radio frequency waves from a second.

Referring now to FIG. 9, a reflector 190 may be selectively oriented so as to focus radio waves from a particular source. More particularly, the reflector 190 comprises a generally concave shape having inner and an outer reflective surfaces. A radio frequency transponder 110 is disposed adjacent to the reflector 190 facing the inner surface. A radio wave 174 transmitted from a first interrogator 172 reflects off of the inner surface of the reflector 190 and is received by the radio frequency transponder 110. In contrast, a radio wave 178 transmitted from a second interrogator 176 reflects off of the outer surface of the reflector 190 and is substantially shielded from the radio frequency transponder 110. Similarly, a third interrogator 180 transmits a radio wave 177 that misses the radio frequency transponder 100 entirely, even though the third interrogator is generally in front of the reflector 190. This is because the high gain antenna provided by the reflector 190 yields a main beam that is strong and narrow, and the antenna may be further arranged to keep the side lobes small. In this way, the radio frequency transponder 110 may have radio waves from one particular location selectively focused while excluding radio waves from other sources. This embodiment may be particularly useful in environments where there are a plurality of radio wave sources. In this manner, a particular interrogator source 172 may be focused, while another extraneous interrogator source 176 is excluded from communication with the radio frequency transponder 110.

Figure 10:
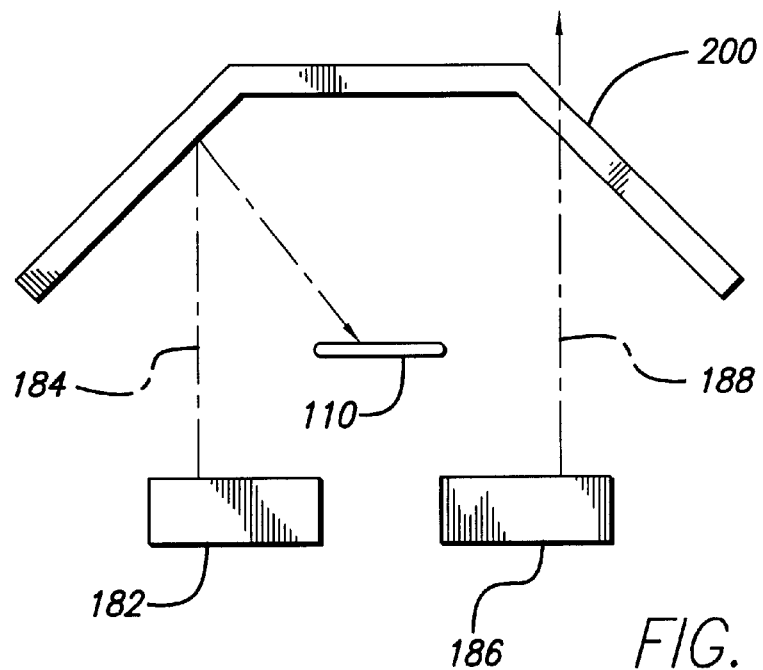
FIG. 10 is a view of a radio frequency identification transponder assembly including a planar reflector wherein the planar reflector is comprised of a reflective material capable of selectively reflecting.

Referring now to FIG. 10, a frequency selective reflector 200 is shown. The reflector 200 has a generally concave shape, with a radio frequency transponder 110 disposed facing the reflector. In this embodiment, the reflector 200 is comprised of a frequency selective material that reflects radio waves 184 from a first interrogator source 182 toward the radio frequency transponder 110 while permitting radio waves 188 from a second interrogator source 186 to pass entirely through the reflector 200. The frequency selective material of the reflector 200 may be selected so that it will only reflect certain wavelengths while allowing other wavelengths to pass through the medium. Alternatively, the frequency selective material may operate to absorb certain wavelengths while allowing other wavelengths to pass, or any other method of frequency selection, such as polarization, contemplated by a person of ordinary skill in the art.

Figure 11A:
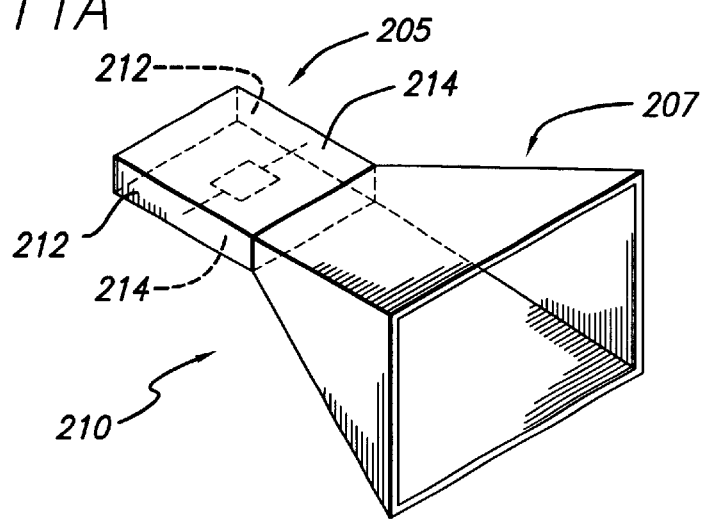
FIG. 11A is an isometric view of a radio frequency identification transponder assembly having a horn antenna.
Figure 11B:
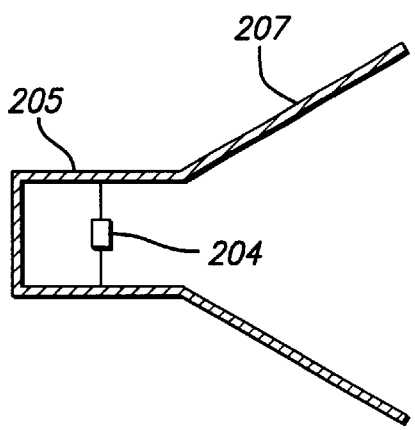
FIG. 11B is a top plan view of the radio frequency identification transponder assembly shown in FIG. 11A.
Figure 11C:
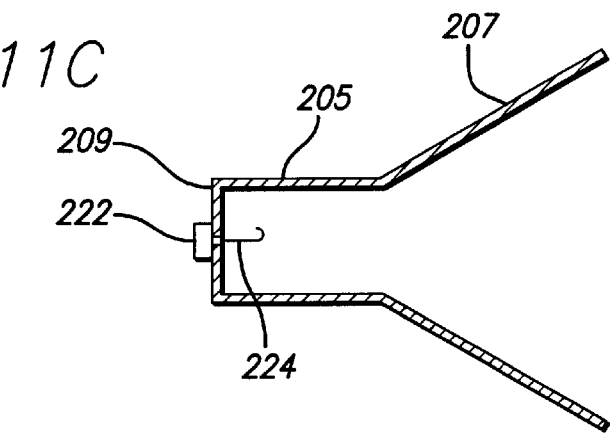
FIG. 11C is a top plan view of an alternative embodiment of the radio frequency identification transponder assembly shown in FIG. 11A.

Referring now to FIGS. 11A, 11B and 11C, a horn antenna structure is used to improve the gain and directivity of the radio waves communicated to and from a radio frequency transponder. A horn antenna 210 comprises a waveguide portion 205 and a horn portion 207. The waveguide portion 205 has the form of an elongated parallelpiped including sidewalls 212 and upper/lower walls 214. Each of the walls of the waveguide portion 205 associate with a wall of the horn portion 207. A rectangular opening is defined at the end of the horn portion 207 and provides a radiating aperture. As known in the art, a horn antenna expands the electric field region that extends along a pair of side surfaces, such as the sidewalls 212, and produces therefrom an electromagnetic field at the radiating aperture.

The horn antenna 210 further includes a radio frequency transponder 204 disposed within the waveguide portion 205. The radio frequency transponder 204 comprises an RF integrated circuit and an impedance matching circuit. Unlike the radio frequency transponder 110 described above, the radio frequency transponder 204 does not include an antenna. Instead, as shown in FIG. 11B, the impedance matching circuit of the radio frequency transponder 204 is electrically coupled directly to the sidewalls 212 of the horn antenna 210. The impedance matching circuit matches the impedance of the RF integrated circuit to the sidewalls 212. An alternative embodiment is shown in FIG. 11C, in which a radio frequency transponder 222 is coupled to an external surface 209 of the waveguide portion 205. As in the embodiment of FIG. 11B, the radio frequency transponder 222 comprises an RF integrated circuit and an impedance matching circuit. The impedance matching circuit is electrically coupled to an inductive coupling loop 224 that extends within the waveguide portion 205 of the horn atenna 210. The inductive coupling loop 224 permits radio waves to be communicated between the sidewalls 212 of the horn anntenna 210 and the radio frequency transponder 222.

Figure 12:
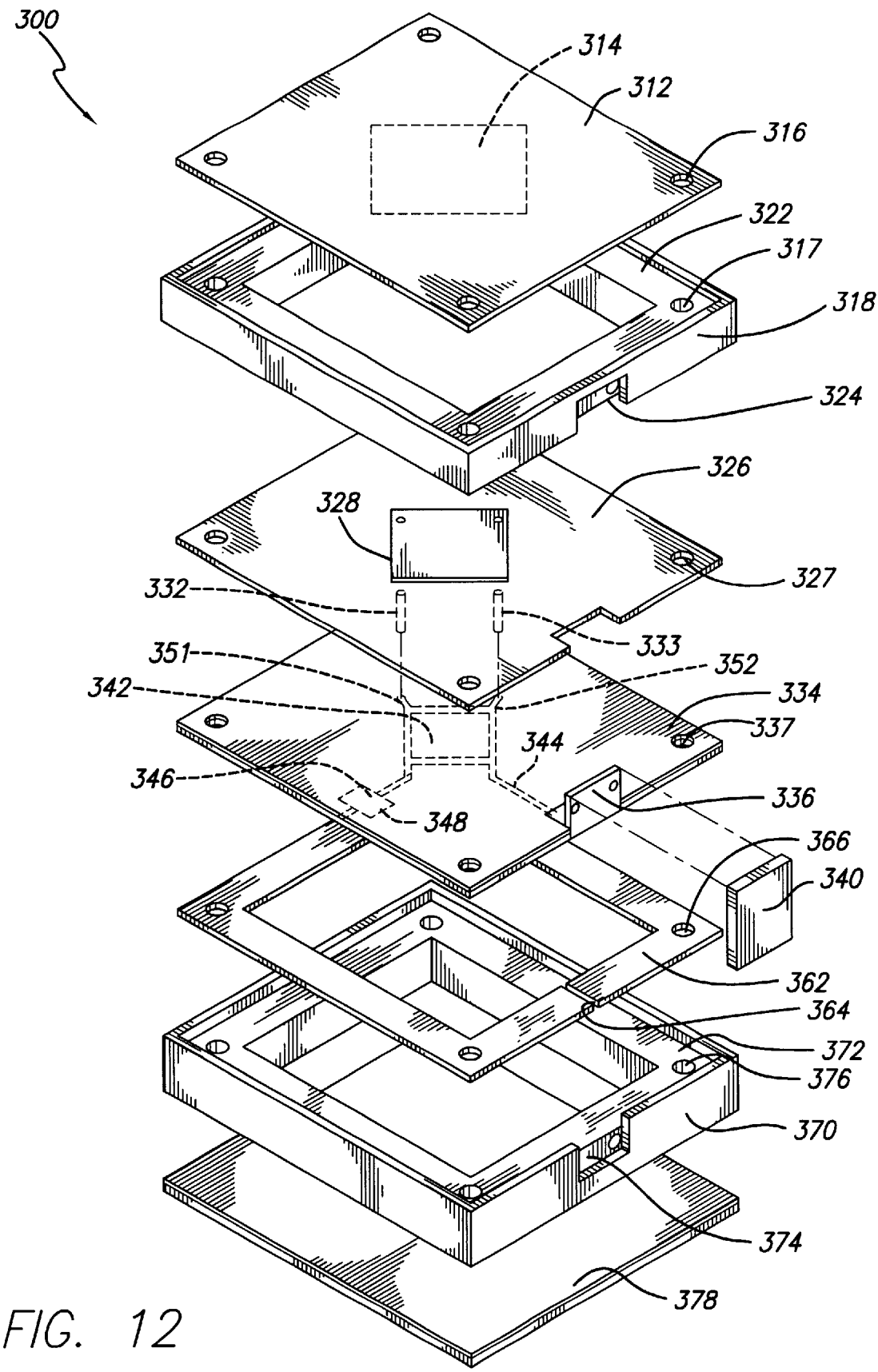
FIG. 12 is an exploded view of an embodiment of a patch antenna in accordance with the present invention.

FIG. 12 is an exploded view of a patch antenna 300 constructed in accordance with another embodiment of the present invention. As known in the art, a patch antenna is advantageous since it can provide circular polarization in addition to high gain. An RFID integrated circuit package 340 may be attached to the antenna as shown in FIG. 12. The patch antenna 300 comprises plural layers, as will be described in further detail below. It should be appreciated that the RFID integrated circuit package 340 and the patch antenna 300 may further be utilized with the various reflector systems described previously.

More particularly, the patch antenna 300 comprises four substrate layers 312, 326, 334, and 378, and two spacer layers 318, 370, each having a generally rectangular shape. For ease of construction, the substrate layers 312, 326, 334, and 378 are each comprised of a dielectric circuit board material, such as FR-4, having a conductive metal layer (e.g., copper or aluminum) provided on at least one side thereof. The conductive metal layers may be selectively patterned using known techniques, such as photolithography, to form the various radiating patches that will be described in greater detail below. The uppermost substrate layer 312 has a radiating patch 314 provided on a bottom (i.e., unexposed) surface thereof. The radiating patch 314 is patterned from a conductive metal layer and has a generally rectangular shape that is offset approximately 45° from the orientation of the substrate layer 312. The upper (i.e., exposed) surface of the substrate layer 312 does not have any conductive material thereon. The substrate layer 312 further includes mounting holes 316 provided in corners thereof that are used to facilitate mechanical coupling of the substrate layer to the subsequent layers described hereinbelow.

The first spacer layer 318 is disposed below the uppermost substrate layer 312. The spacer layer 318 is comprised of a non-conductive material, such as plastic, and may be formed by known techniques, such as injection molding or machining. The spacer layer 318 further includes a recess 322 adapted to receive the uppermost substrate layer 312 therein. The spacer layer includes mounting holes 317 disposed in substantial alignment with the mounting holes 316 of the substrate layer 312. As will be further described below, the spacer layer 318 separates the adjacent substrate layers by a predetermined distance defined by the height of the spacer in order to determine the radiation pattern and gain of the patch antenna 300. The spacer layer 318 also includes a recess 324 on a side surface thereof to permit attachment of the RFID integrated circuit package 340, described below.

The second and third substrate layers 326, 334 are disposed below the first spacer layer 318. The second substrate layer 326 includes a feeder patch 328 provided on an upper surface thereof. The feeder patch 328 is patterned from a conductive metal layer and has a generally rectangular shape that is offset approximately 45° from the orientation of the second substrate layer 326 in the same orientation as the radiating patch 314 of the uppermost substrate layer 312. The feeder patch 328 is slightly smaller in area than the radiating patch 314. The bottom surface of the second substrate layer 326 may or may not have any conductive material thereon, as will be described in greater detail below. The second substrate layer 326 further includes mounting holes 327 provided in corners thereof in alignment with the aformentioned mounting holes. The second substrate layer 326 also has a notch 329 formed in a side edge thereof in alignment with the recess 324 of the spacer 318 to accommodate attachment of the RFID integrated circuit package 340.

The third substrate layer 334 has conductive material covering a top surface thereof, and a hybrid coupler 342 patterned on the bottom surface thereof. The hybrid coupler 342 comprises an input port 344, an isolated port 346, a direct port 352, and a coupled port 351. As known in the art, there is a 90° phase difference between the direct port 352 and the coupled port 351. A signal present at the input port 344 is divided equally between the direct and coupled ports 352, 351 with little or no signal present at the isolated port 346. A termination resistor 348 is coupled to the isolated port 346. Conductive via pins 332, 333 are used to couple the coupled and direct ports 351, 352, respectively, to separate points on the feeder patch 328. The via pins 332, 333 are isolated from the conductive material covering the top surface of the third substrate layer 334 by openings, or clearance holes, formed in the conductive material.

The third substrate layer 334 further includes a flange connector 336 to which the RFID integrated circuit package 340 is mounted. The flange connector 336 facilitates coupling of the RFID integrated circuit package 340 to the input port 344 of the hybrid coupler 342 at the bottom surface of the third substrate layer 334 and to the conductive material at the upper surface of the third substrate layer. The third substrate layer 334 further includes mounting holes 337 provided in corners thereof in alignment with the aformentioned mounting holes. The second substrate layer 326 and the third substrate layer 334 may be laminated together to form a single multi-layer panel. Alternatively, it should be appreciated that the second substrate layer 326 and the third substrate layer 334 may be constructed of a single circuit board having multiple layers.

A second spacer layer 370 is provided below the third substrate layer 334. As with the first spacer layer 318, the second spacer layer 370 is comprised of a non-conductive material, such as plastic, and may be formed by known techniques, such as injection molding or machining. The second spacer layer 370 further includes a recess 372 adapted to receive the third substrate layer 334 therein. A grommet 362 may also be provided between the second spacer layer 370 and the third substrate layer 334. The grommet 362 and the second spacer layer 370 each include respective mounting holes 366, 376 disposed in substantial alignment with the aforementioned mounting holes. The grommet 362 may further include a cutout 364 permitting passage of a conductive trace to the input port 344 from the flange connector 336. The second spacer layer 370 also includes a recess 374 on a side surface thereof to permit attachment of the RFID integrated circuit package 340. The recess 374 of the second spacer layer 370 is adapted to receive the bottom half of the RFID integrated circuit package 340, and the recess 324 of the first spacer layer 370 (described above) is adapted to receive the top half of the RFID integrated circuit package.

A fourth substrate layer 378 is provided on a bottom surface of the second spacer layer 370. The fourth substrate layer 378 includes conductive material covering a top surface thereof. Unlike the other substrate layers, the fourth substrate layer 378 may alternatively be comprised of a solid sheet of conductive material, such as copper or aluminum, rather than from dielectric material. The fourth substrate layer 378 serves to shield electromagnetic radiation from the bottom of the patch antenna 300.

In operation, the RFID integrated circuit package 340 provides a signal to the input port 344 of the hybrid coupler 342. In turn, the hybrid coupler 342 splits the input signal into two signals that are out of phase by 90°. More specifically, the two signals are excited in different modes, with a 90° difference in polarization and field distribution. The two signals pass to the feeder patch 328 through the respective via pins 332, 333 to excite the feeder patch and cause it to couple electromagnetic energy to the radiating patch 314. The conductive material provided on the upper surface of the third substrate layer 334 serves as a ground plane for the feeder patch 328, with the thickness of the second substrate layer 336 defining the spacing between the feeder patch and the ground plane. Alternatively, if the bottom surface of the second substrate layer 326 has conductive material, then it provides a ground plane for the feeder patch 328. If the second and third substrate layers 326, 334 were combined into a single multi-layer board, a single layer of conductive material will serve as the ground plane for the feeder patch 328 and the hybrid coupler 342.

The radiating patch 314 then radiates the coupled electromagnetic energy in a circular polarization pattern from the patch antenna 300. It should be appreciated that the gain of the patch antenna 300 can be controlled by selecting the widths of the first spacer layer 318, as well as the size and shape of the feeder patch 328 and radiating patch 314. Moreover, the sealed construction of the patch antenna 300 makes it generally immune to environmental effects. It should also be appreciated that the RFID integrated circuit package 340 may be disposed within the patch antenna 300 rather than mounted outside as shown in FIG. 12. For example, the integrated circuit package 340 may be placed directly on the third substrate layer 334 alongside the hybrid coupler 342. This alternative construction would avoid the need for the flange connector 336 and recesses 324, 372.

Figure 13A:
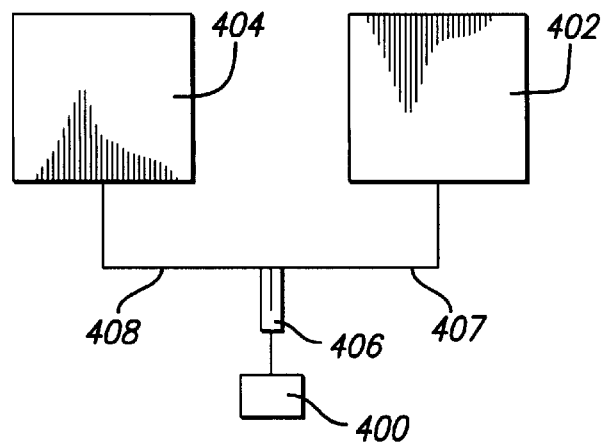
FIG. 13A is a top plan view of a radio frequency identification transponder including two-element patch antenna array.
Figure 13B:
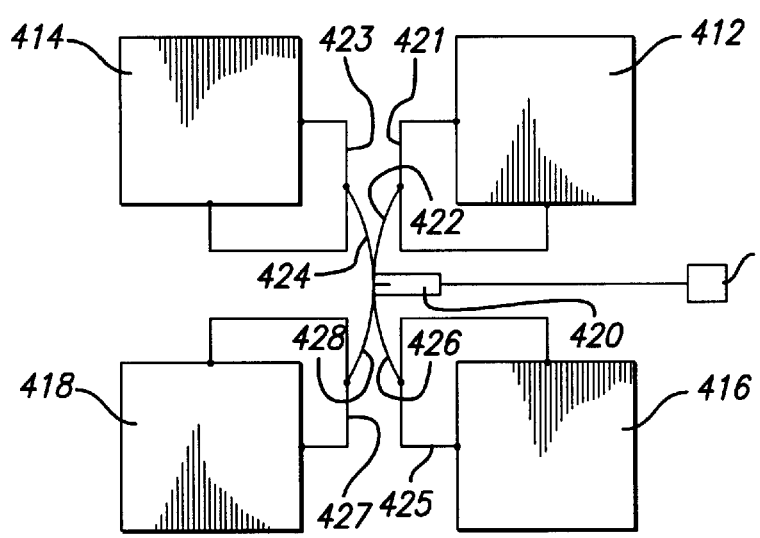
FIG. 13B is a top plan view of a radio frequency identification transponder including four-element patch antenna array.

FIGS. 13A–13B illustrate embodiments of a patch array antenna used to improve the gain of radio waves communicated to and from a radio frequency transponder. Referring first to FIG. 13A, a two-element patch array antenna is shown, comprising a first patch 402 and a second patch 404. The patches 402, 404 are comprised of a conductive material, such as copper, and are patterned in a generally rectangular shape using known techniques such as described above. The patches 402, 404 may be disposed on a common substrate layer, thereby avoiding the need for multiple layers with vias joining the layers. An RFID integrated circuit 400 is coupled to the patches 402, 404 through an impedance transformer 406 and feedline traces 407, 408, respectively. The RFID integrated circuit 400 preferably includes an impedance matching circuit that transforms the impedance of the integrated circuit to a convenient impedance, such as 50 ohms. As shown in FIG. 13A, the two patches 402, 404 are coupled to the respective feedline traces 407, 408 at the same corresponding edge of the patches (i.e., the bottom edge), providing linear polarization of the antenna array. The feedline traces 407, 408 may be formed of metal lines patterned on the common substrate layer.

The impedance transformer 406 provides a match between the impedance of the RFID integrated circuit 400 and the antenna array in order to promote efficient signal communication therebetween. In the embodiment of FIG. 13A, the impedance transformer 406 is arranged in a conventional fan-out configuration with the feedline traces 407, 408 extending therefrom. Each of the patches 402, 404 have an input impedance ($R_{IN}$) measured at the junction between the feedline traces 407, 408 and the patch. The impedance transformer 406 converts the total impedance of the parallel connection of the two feedline traces 407, 408 and respective patches 402, 404 to the transformed impedance of the RFID integrated circuit 400. Particularly, the impedance of the impedance transformer 406 is equal to the square root of the product of the impedances that appear at its two ends, with a first end being the total impedance of the parallel connection of the two feedline traces 40, 408 and respective patches 402, 404, and the other end being the transformed impedance of the RFID integrated circuit 400. The impedance transformer 406 may be provided by a region (e.g., rectangular) having dimensions selected to yield a desired impedance. The rectangular region may be comprised of conductive material patterned on a substrate in the same manner that the patches 402, 404 and feedline traces 407, 408 are patterned.

FIG. 13B illustrates a four-element patch array antenna, having patches 412, 414, 416 and 418. As in the embodiment of FIG. 13A, the patches 412, 414, 416 and 418 are comprised of a conductive material, such as copper, have a generally rectangular shape, and may be disposed on a common substrate layer. An RFID integrated circuit 400 is coupled to the patches 412, 414, 416, 418 through an impedance transformer 420 and feedline traces 422, 424, 426, 428, respectively. The feedline traces 422, 424, 426, 428 each branch to corresponding traces 421, 423, 425, 427, that in turn are coupled to the patches 412, 414, 416, 418, respectively. Each one of the traces 421, 423, 425, 427 is coupled to two edges of the respective patches 412, 414, 416, 418, thereby providing circular polarization of the antenna array.

It should be appreciated that other sized patch array antennas, such as six-element, eight-element or sixteen-element, can be fabricated combining the foregoing techniques. For example, an eight-element array may be fabricated by coupling the eight patches using either a single impedance transformer and an eight-way fan-out configuration, or using a hierarchic structure where four two-element sub-arrays, with each sub-array configured as in FIG. 13A, are combined with a four-way fan-out quarter-wave transformer, or two four-element sub-arrays, with each sub-array configured as in FIG. 13B, are combined with a two-way fan-out quarter-wave transformer.

Figure 14A:
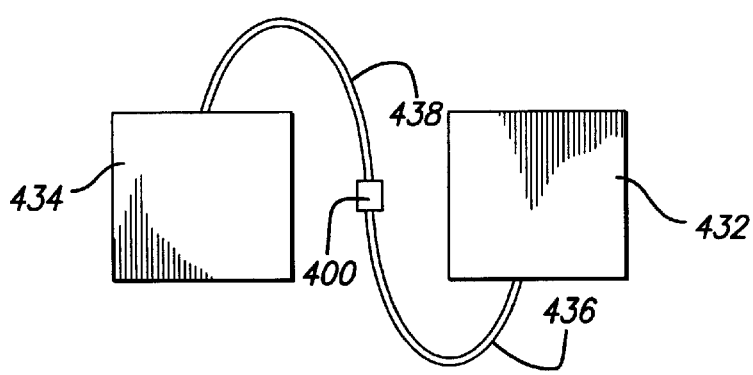
FIG. 14A is a top plan view of a radio frequency identification transponder including a dipole antenna having patch elements adapted to provide vertical polarization.
Figure 14B:
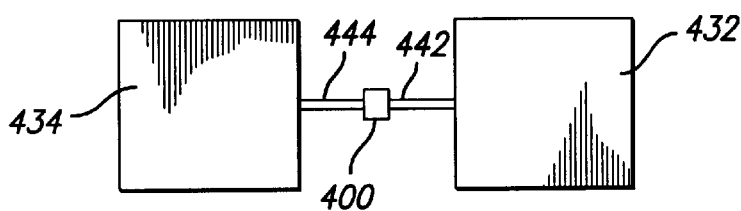
FIG. 14B is a top plan view of a radio frequency identification transponder including a dipole antenna having patch elements adapted to provide horizontal polarization.

FIGS. 14A and 14B each illustrate RFID transponders utilizing dipole antennas fabricated with patch elements. Due to the dipole-like placement of the two patches, the signal induced at the two ends of the integrated circuit 400 is alternating like that across the terminals of a dipole antenna. Instead of impedance transformers as in the embodiments of FIGS. 13A–13B, impedance matching circuits are used to couple the patches to the RFID integrated circuit 400. In FIG. 14A, patches 432, 434 are coupled to the RFID integrated circuit 400 using matching circuits 436, 438, respectively. Similarly, in FIG. 14B, patches 432, 434 are coupled to the RFID integrated circuit 400 using matching circuits 442, 444, respectively. Like the impedance transformers described above, the matching circuits 436, 438, 442, 444 may each comprise a plurality of generally rectangular regions of conductive material having dimensions that define a desired impedance. The matching circuits 436, 438 may be curved as shown in FIG. 14A, or may alternatively be provided by plural individual rectangular regions that combine to provide the desired curvature and impedance.

In the dipole patch antenna of FIG. 14A, the matching circuits 436, 438 are coupled to horizontal edges of the patches 432, 434. Specifically, matching circuit 436 is coupled to a lower edge of patch 432 and matching circuit 438 is coupled to an upper edge of patch 434 (as shown in FIG. 14A). This particular configuration provides vertical polarization. Alternatively, in the dipole patch antenna of FIG. 14B, the matching circuits 436, 438 are each coupled to vertical edges of the patches 432, 434. Specifically, matching circuit 442 is coupled to a left edge of patch 432 and matching circuit 444 is coupled to a right edge of patch 434. This configuration provides horizontal polarization. It is also possible to feed the patches 432, 434 on two respective edges as in FIG. 13B in order to achieve circular polarization.

Figure 15A:
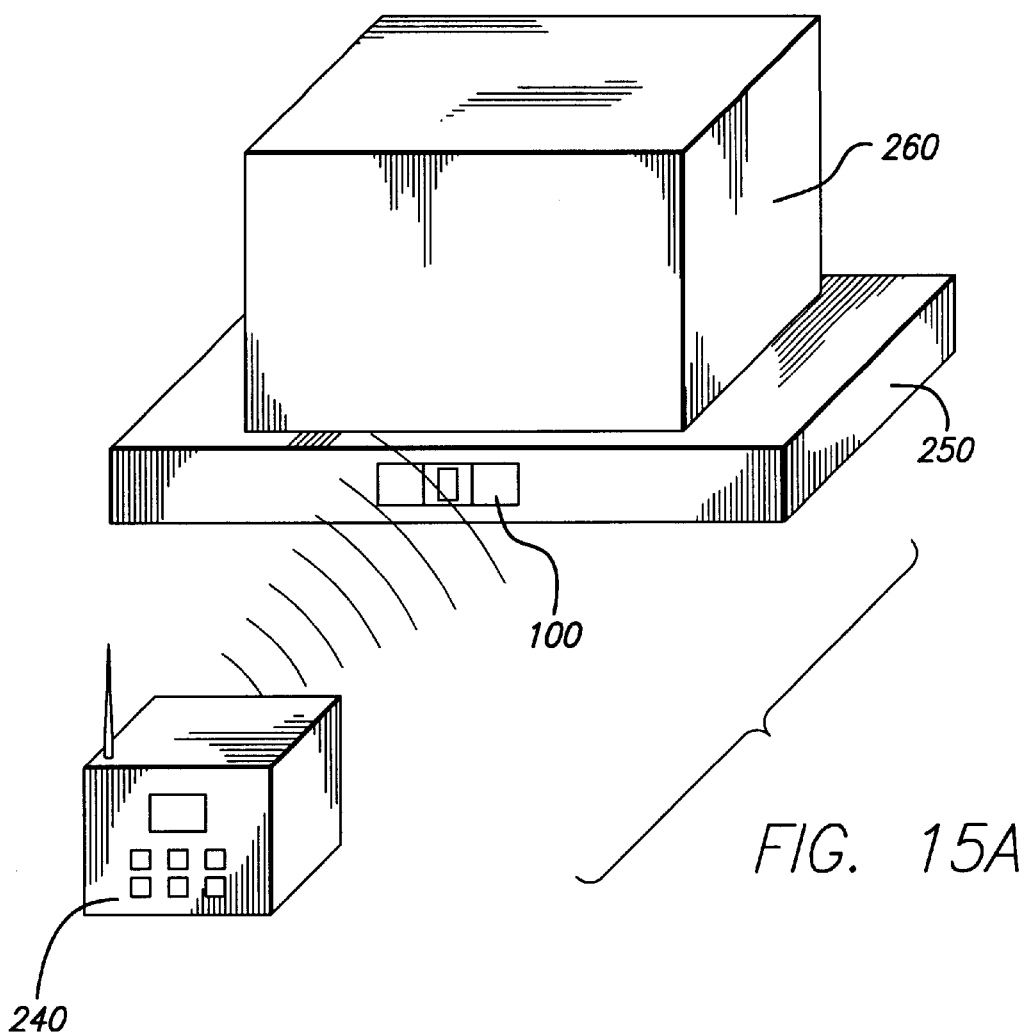
FIG. 15A is a view of an exemplary embodiment of a radio frequency identification transponder assembly including a reflector disposed in a pallet so as to have increased range.
Figure 15B:
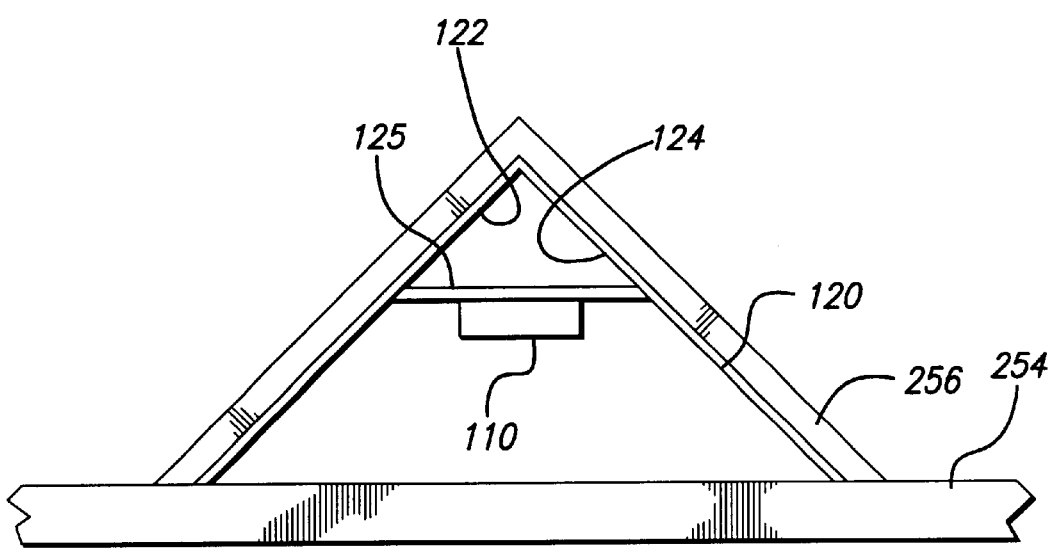
FIG. 15B is an expanded view of FIG. 15A, showing an exemplary radio frequency transponder disposed proximally to a reflector molded in a pallet.

Lastly, referring now to FIGS. 15A and 15B, an exemplary application of the radio frequency identification transponder assembly of the present invention in an RFID system is shown. A radio frequency identification transponder assembly 100 is associated with an item 260 to be identified, inventoried, tracked, etc. The radio frequency identification transponder assembly 100 is as described above with respect to the embodiment of FIGS. 1A and 1B, though it should be appreciated that any of the aforementioned embodiments of the invention could be advantageously utilized. Particularly, the radio frequency identification assembly 100 includes a radio frequency transponder 110 disposed within a triangular reflector 120 that includes reflective surfaces 122, 124. A bracket 125 that extends between the reflective surfaces 122, 124 supports the radio frequency transponder 110.

As shown in FIG. 15A, the radio frequency transponder assembly 100 may be disposed on or in a pallet 250 supporting the item 260. Alternately, the radio frequency transponder 100 could be attached to the item, disposed within a container holding the item, etc. Information such as inventory information, routing information, etc. is programmed into the memory of the radio frequency identification transponder assembly 100. This information may, for example, be preprogrammed into transponder assembly 100, or, written to the transponder assembly 100 after it is associated with the item 260. The radio frequency transponder assembly 100 may be positioned in a cavity 252 formed in an outer frame 254 of the pallet 250 in which an item or items 260 is shipped or stored. Such a chamber 252 may, for example, be formed between one or more internal supports and an exterior wall of the pallet 250. Preferably, the one or more supports 256 forming the cavity 252 are formed so that they have the characteristic shape of the reflector 120 (e.g., a paraboloidal, ellipsoidal, hyperboloidal, or spherical dish reflector; a parabolic, elliptic, hyperbolic, circular, or curvilinear generally cylindrical reflector; a corner reflector, etc.). For example, as shown in FIG. 15B, wherein the reflector 120 is a corner reflector, the support 256 may be v-shaped in order to conform to and support the reflector side surfaces 122, 124. In this case, the side surfaces 122, 124 may be formed by trimming and bending a sheet of a conducting metal to have the proper size and shape and inserting the sheet within the cavity 152. Alternately, a radio frequency transponder assembly 100 may be fitted into an existing chamber in the pallet 250.

An RFID system includes a radio frequency transmitter-receiver unit 240, also referred to as a base station or interrogator. The interrogator 240 may be fixedly located (e.g., a central base station), hand-held (e.g., a hand-held portable data collection terminal or computer), or mounted to a vehicle (e.g., a forklift, delivery truck, etc.). The interrogator 240 includes a radio frequency (RF) transmitter or transceiver and an antenna configured to generate a radio frequency interrogation field suitable for interrogating the radio frequency transponder 110. The radio frequency transponder 110 modulates and back-scatters the interrogation field to provide a response signal comprising encoded data to the receiver of the interrogator 240. The data encoded in the response signal may be as simple as 1-bit or the data may be a serial stream providing a substantial amount of data to the interrogator 240. Operating frequencies of such systems typically range from 13 MHz to 6 GHz. By using the reflector 120 embedded within the pallet 250, it should be appreciated that the range and directivity of the interrogation field provided by the interrogator 240 would be substantially increased.

Various modifications may be made in and to the above-described embodiments without departing from the spirit and scope of the invention. For example, various modifications and changes may be made in the configuration of the radio frequency transponder such as reconfiguration of the antenna geometry, circuit chip construction, substrate material and geometry, and the like. Further, use of the RFID tag is directed to a wide variety of applications including, but not limited to, airline baggage (i.e., luggage, freight, and mail), postal service, manufacturing, inventory control, personnel security, and the like.

It is believed that the methods and apparatus of the present invention and many of its attendant advantages will be understood from the foregoing description. It will be apparent that various changes may be made in the form, construction and arrangement of the components thereof without departing from the scope and spirit of the invention or without sacrificing all of its material advantages. The forms hereinbefore described being merely exemplary and explanatory embodiments, it is the intention of the following claims to encompass and include all such changes.

What is claimed is:

1. A radio frequency tag system comprising:
   at least one radio frequency integrated circuit,
   at least one antenna coupled to the radio frequency integrated circuit; and
   at least one reflector disposed proximally to said antenna, said reflector adapted for collecting and focusing energy from the electromagnetic field to/from said antenna so that the gain of said antenna is increased, wherein the at least one high gain antenna further comprises a horn antenna comprising a waveguide portion and a horn portion.

2. The radio frequency tag system as defined in claim 1, wherein the at least one radio frequency integrated circuit being coupled between opposing walls of said waveguide portion.

3. The radio frequency tag system as defined in claim 1, wherein the at least one radio frequency integrated circuit being disposed externally of said waveguide portion and being coupled to an inductive coupling loop disposed within the waveguide portion.

4. A radio frequency tag system comprising:
   at least one radio frequency integrated circuit,
   at least one antenna coupled to the radio frequency integrated circuit; and
   at least one reflector disposed proximally to said antenna, said reflector adapted for collecting and focusing energy from the electromagnetic field to/from said antenna so that the gain of said antenna is increased, wherein the at least one reflector further comprises multiple reflectors for reflecting electromagnetic radiation to/from the at least one antenna.

5. A radio frequency tag system comprising:
   at least one radio frequency integrated circuit,
   at least one antenna coupled to the radio frequency integrated circuit; and
   at least one reflector disposed proximally to said antenna, said reflector adapted for collecting and focusing energy from the electromagnetic field to/from said antenna so that the gain of said antenna is increased, wherein said at least one reflector further comprises a shape comprising at least one of concave, cylindrical, corrugated, paraboloidal, ellipsoidal, hyperbolic, hyperboloidal, spherical, and spheroid.

6. A radio frequency tag system comprising:
   at least one radio frequency integrated circuit,
   at least one antenna coupled to the radio frequency integrated circuit; and
   at least one reflector disposed proximally to said antenna, said reflector adapted for collecting and focusing energy from the electromagnetic field to/from said antenna so that the gain of said antenna is increased, the at least one antenna further comprising a patch antenna, wherein the patch antenna further comprises a multi-layer patch antenna.

7. The radio frequency tag system as defined in claim 6, wherein the multi-layer patch antenna further comprises a feeder patch coupled to the at least one radio frequency integrated circuit and a radiating patch spaced from the feeder patch.

8. The radio frequency tag system as defined in claim 7, wherein the multi-layer patch antenna further comprises a ground plane spaced from the feeder patch opposite the radiating patch.

9. A radio frequency tag system comprising:
   at least one radio frequency integrated circuit,
   at least one antenna coupled to the radio frequency integrated circuit; and
   at least one reflector disposed proximally to said antenna, said reflector adapted for collecting and focusing energy from the electromagnetic field to/from said antenna so that the gain of said antenna is increased, the at least one antenna further comprising plural patch antennas coupled together in a patch antenna array.

10. The radio frequency tag system as defined in claim 9, wherein the patch antenna array further comprises a plurality of patches coupled to the at least one radio frequency integrated circuit.

11. The radio frequency tag system as defined in claim 10, further comprising at least one impedance transformer coupled between the plurality of patches and the at least one radio frequency integrated circuit.

12. The radio frequency tag system as defined in claim 10, wherein the plurality of patches are each coupled to the at least one radio frequency integrated circuit on a corresponding edge thereof to provide linear polarization.

13. The radio frequency tag system as defined in claim 10, wherein the plurality of patches are each coupled to the at least one radio frequency integrated circuit on plural corresponding edges thereof to provide circular polarization.

14. A radio frequency tag system comprising:
    at least one radio frequency integrated circuit,
    at least one antenna coupled to the radio frequency integrated circuit; and
    at least one reflector disposed proximally to said antenna, said reflector adapted for collecting and focusing energy from the electromagnetic field to/from said antenna so that the gain of said antenna is increased, wherein the at least one high gain antenna further comprises a dipole antenna comprising separated first and second patch elements.

15. The radio frequency tag system as defined in claim 14, wherein the first and second patch elements are each coupled to the at least one radio frequency integrated circuit on horizontal edges thereof to provide vertical polarization.

16. The radio frequency tag system as defined in claim 14, wherein the first and second patch elements are each coupled to the at least one radio frequency integrated circuit on vertical edges thereof to provide horizontal polarization.

17. The radio frequency tag system as defined in claim 14, wherein the first and second patch elements are each coupled to the at least one radio frequency integrated circuit on plural edges thereof to provide circular polarization.

18. The radio frequency tag system as defined in claim 14, further comprising impedance matching circuits coupled between the first and second patch elements and the at least one radio frequency integrated circuit.

19. A radio frequency tag system comprising:
    at least one radio frequency integrated circuit;
    means for communicating signals to/from the radio frequency integrated circuit with high gain, wherein the communicating means further comprises a horn antenna, and wherein the horn antenna further comprises a waveguide portion and a horn portion, the at least one radio frequency integrated circuit being disposed externally of said waveguide portion and being coupled to an inductive coupling loop disposed within the waveguide portion.

20. A radio frequency tag system comprising:
    at least one radio frequency integrated circuit;

means for communicating signals to/from the radio frequency integrated circuit with high gain, wherein the communicating means further comprises a patch antenna, wherein the patch antenna further comprises a patch antenna array, wherein the patch antenna array further comprises a plurality of patches coupled to the at least one radio frequency integrated circuit; and at least one impedance transformer coupled between the plurality of patches and the at least one radio frequency integrated circuit.

21. A radio frequency tag system comprising:

at least one radio frequency integrated circuit; and means for communicating signals to/from the radio frequency integrated circuit with high gain, wherein the communicating means further comprises a patch antenna, wherein the patch antenna further comprises a patch antenna array, wherein the patch antenna array further comprises a plurality of patches coupled to the at least one radio frequency integrated circuit, wherein the plurality of patches are each coupled to the at least one radio frequency integrated circuit on plural corresponding edges thereof to provide circular polarization.

22. A radio frequency tag system comprising:

at least one radio frequency integrated circuit, at least one antenna coupled with the radio frequency integrated circuit, and at least one reflector disposed in proximity to the at least one antenna for reflecting electromagnetic radiation therefrom, said reflector being adapted for collecting and focusing energy from the electromagnetic field to/from said antenna so that the gain of said antenna is increased.

23. The radio frequency tag system as defined in claim 22, wherein the at least one antenna further comprises a horn antenna.

24. The radio frequency tag system as defined in claim 23, wherein the at least one antenna further comprises a patch antenna.

25. The radio frequency tag system as defined in claim 23, wherein the at least one antenna further comprises a patch antenna array.

26. The radio frequency tag system as defined in claim 23, wherein the at least one antenna further comprises a multi-layer patch antenna.

27. The radio frequency tag system as defined in claim 22, wherein the at least one antenna further comprises multiple antennas coupled to the at least one integrated circuit.

28. The radio frequency tag system as defined in claim 22, wherein the at least one reflector further comprises multiple reflectors for reflecting electromagnetic radiation to/from the at least one antenna.

29. The radio frequency tag system as defined in claim 22, wherein the at least one reflector further comprises multiple reflectors, each of said multiple antennas having at least one of said multiple reflectors associated therewith.

30. The radio frequency tag system as defined in claim 22, wherein said at least one reflector further comprises a shape selected from angular, concave, cylindrical, flat, corrugated, paraboloidal, ellipsoidal, hyperbolic, hyperboloidal, spherical, and spheroid.

31. A radio frequency tag system comprising:

at least one radio frequency integrated circuit;

at least one high gain antenna coupled to the radio frequency integrated circuit, said at least one high gain antenna including a multi-layer patch antenna, said multi-layer patch antenna including a feeder patch coupled to the at least one radio frequency integrated circuit and a radiating patch spaced from the feeder patch; and a hybrid coupler coupled between the at least one radio frequency integrated circuit and the feeder patch, the hybrid coupler being coupled to the feeder patch at two points having a phase difference therebetween of 90°.

32. A radio frequency tag system comprising:

at least one radio frequency integrated circuit;

means for communicating signals to/from the radio frequency integrated circuit with high gain, said means including a multi-layer patch antenna, said multi-layer patch antenna further comprising a feeder patch coupled to the at least one radio frequency integrated circuit and a radiating patch spaced from the feeder patch; and a hybrid coupler coupled between the at least one radio frequency integrated circuit and the feeder patch, the hybrid coupler being coupled to the feeder patch at two points having a phase difference therebetween of 90°.

* * * * *